Aug. 24, 1943.  G. F. KUHN  2,327,438
CATALYTIC CRACKING APPARATUS
Filed March 21, 1941    6 Sheets-Sheet 3
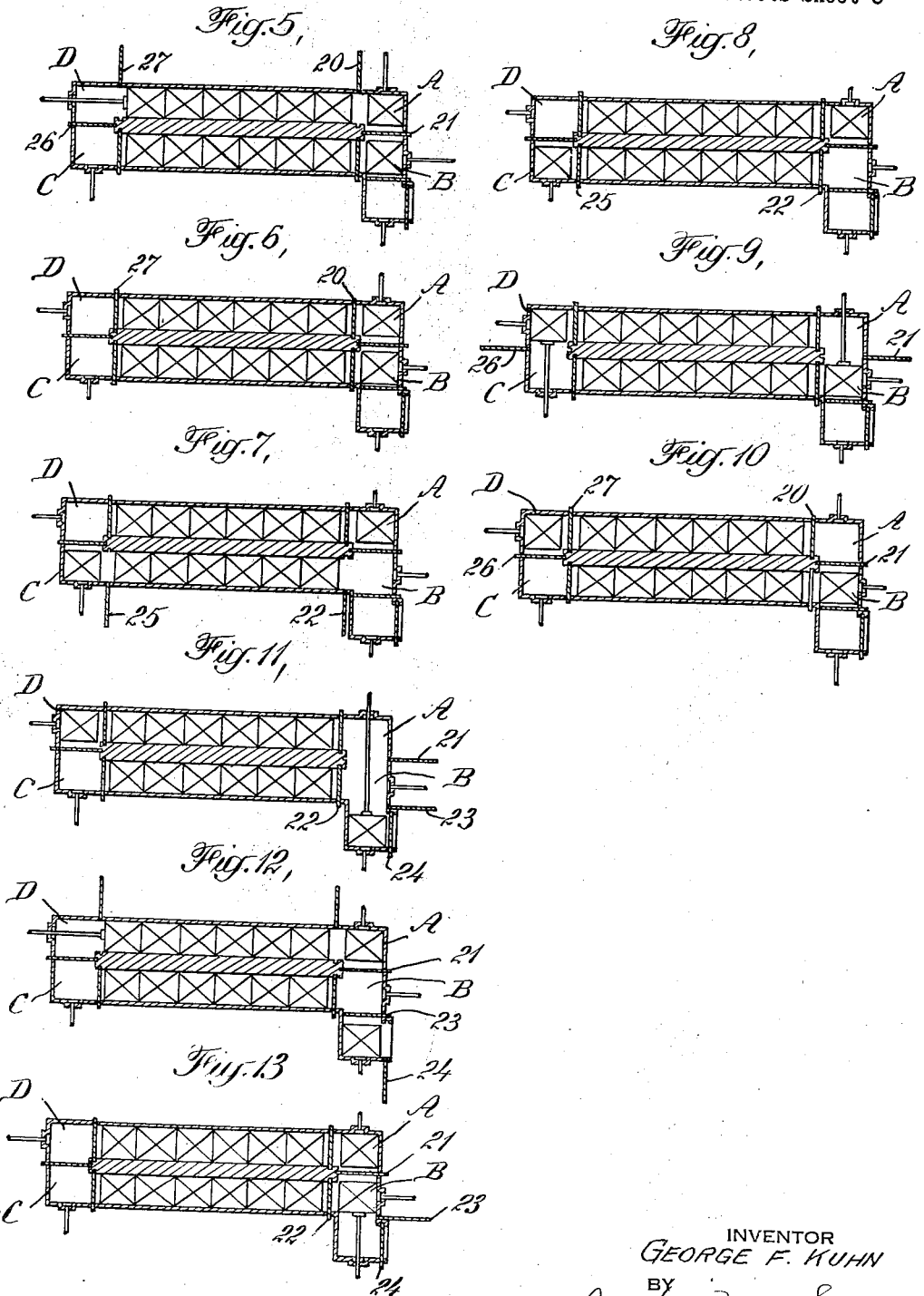
INVENTOR
GEORGE F. KUHN
BY
ATTORNEYS

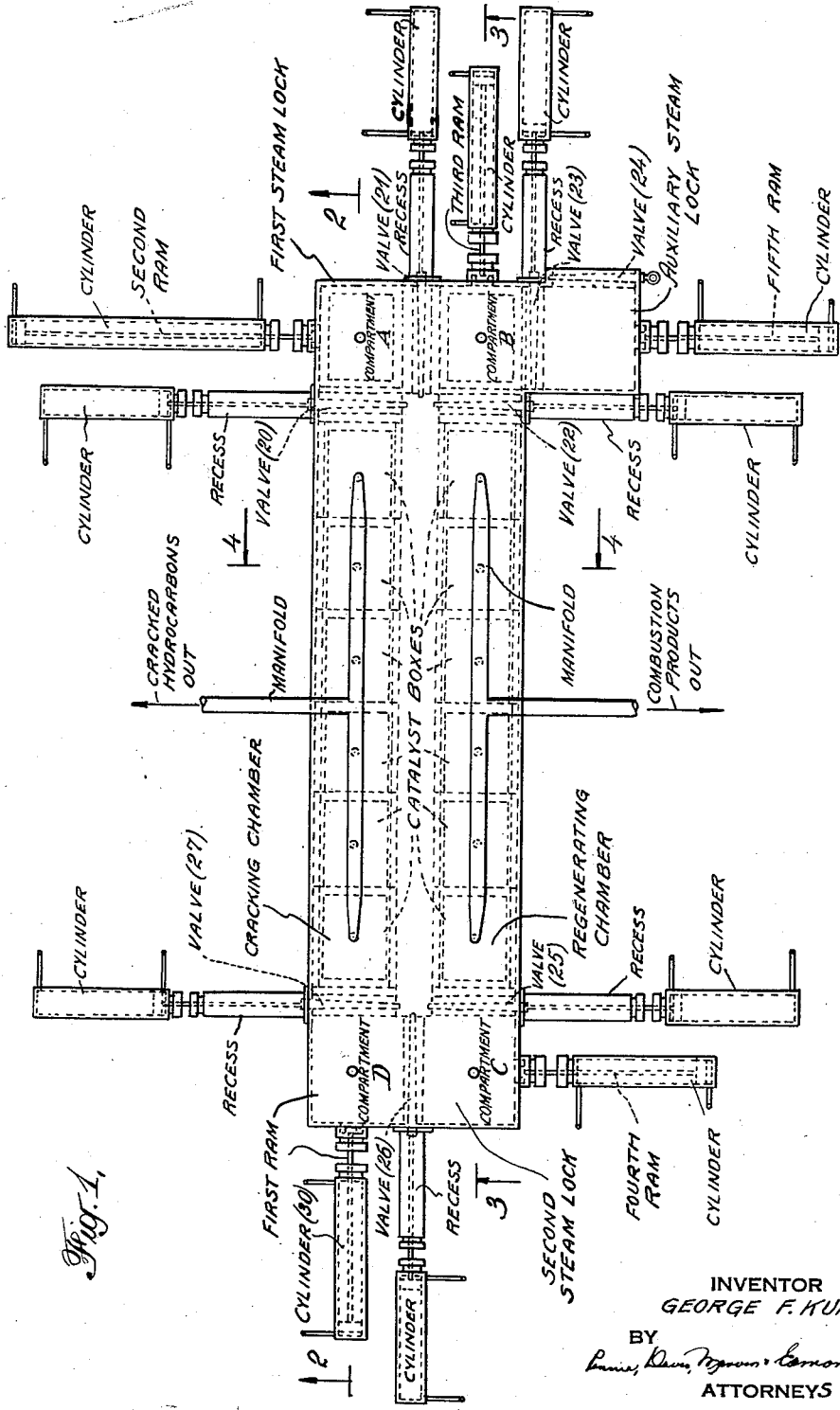

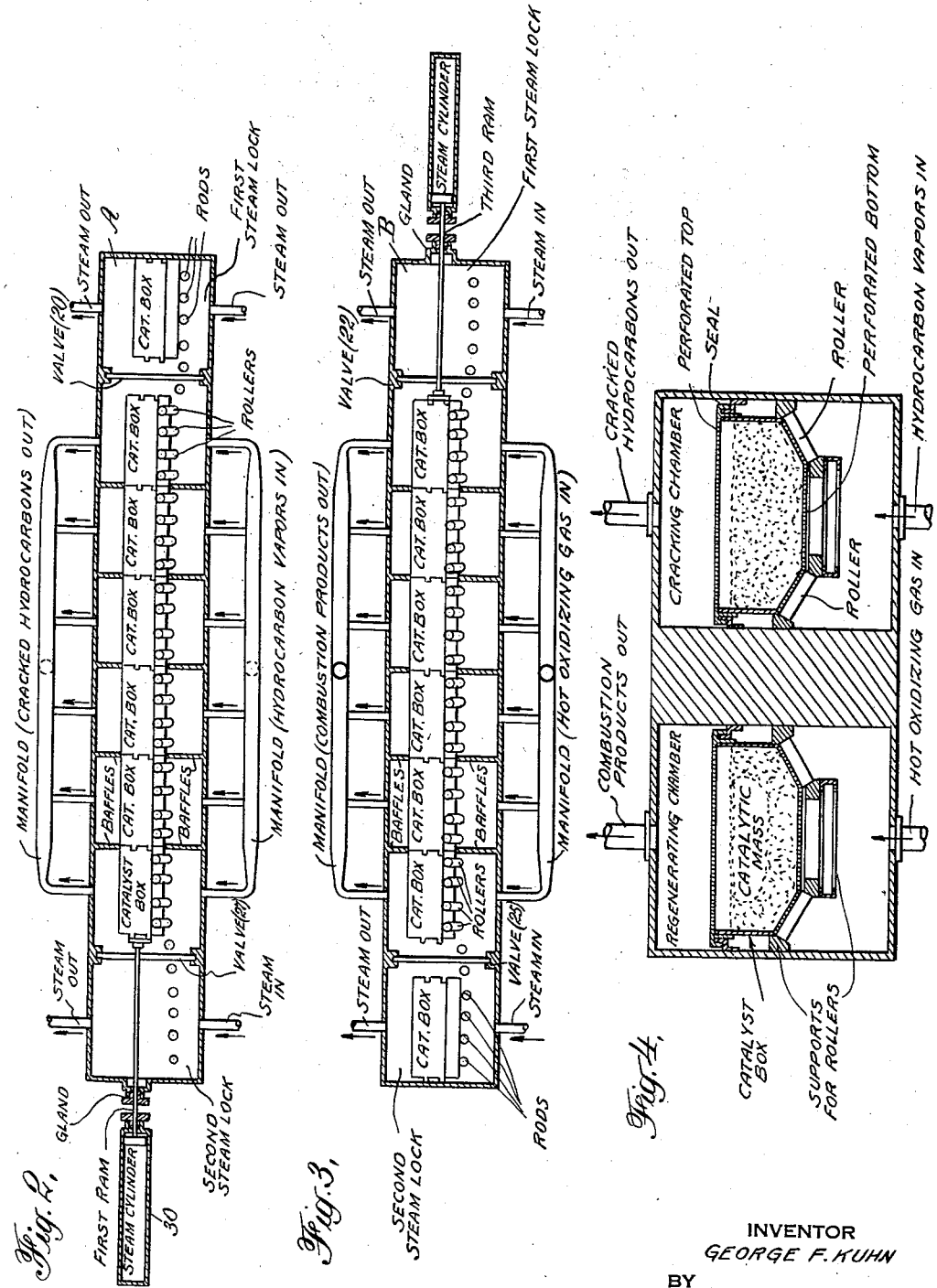

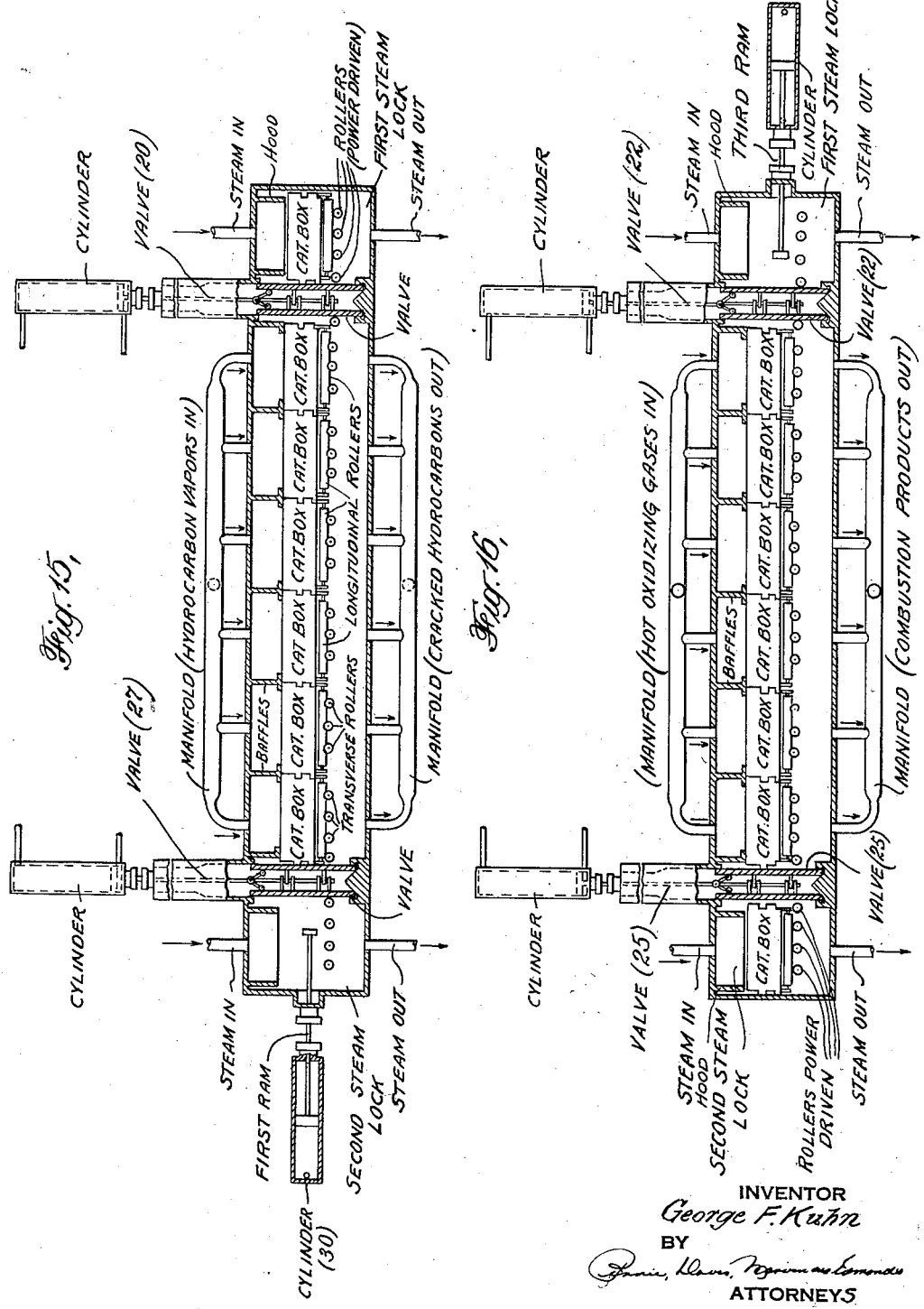

Aug. 24, 1943.  G. F. KUHN  2,327,438
CATALYTIC CRACKING APPARATUS
Filed March 21, 1941  6 Sheets-Sheet 6

INVENTOR
George F. Kuhn
BY
*Pennie, Davis, Marvin and Edmonds*
ATTORNEYS

Patented Aug. 24, 1943

2,327,438

UNITED STATES PATENT OFFICE 2,327,438

CATALYTIC CRACKING APPARATUS

George F. Kuhn, Hammond, Ind., assignor to Sinclair Refining Company, New York, N. Y., a corporation of Maine Application March 21, 1941, Serial No. 384,445

8 Claims. (Cl. 196—52)

This invention relates to catalysis and particularly to the catalytic cracking of hydrocarbons. The invention provides improved apparatus for carrying out such operations in which higher-boiling hydrocarbons are cracked in the presence of a catalyst to provide more valuable lower-boiling hydrocarbons.

In catalytic cracking, the hydrocarbons to be cracked (for example, a petroleum stock) are vaporized by heating under a low pressure and usually in the presence of steam to promote vaporization. The resulting vaporous mixture of hydrocarbons and steam is sent to the cracking operation where a stream of the mixture is passed in contact with a solid and usually porous or granular catalytic mass (such, for example, as fuller's earth or kieselguhr alone or admixed with various metals or metal salts) in a reaction zone. Lower-boiling hydrocarbons and "carbon" result from the cracking. The lower-boiling hydrocarbons and some of the carbon are removed from the reaction zone as formed, but a substantial portion of the carbon adheres to the catalyst and tends to coat its surfaces and choke its pores. As the carbon accumulates and fouls the catalyst, the activity of the latter decreases. When the economic limit of catalytic activity has been reached, the catalytic mass is subjected to regeneration, usually by passing a hot oxidizing gas in contact therewith so as to burn off the accumulated carbon. The catalyst thus regenerated is again brought in contact with the stream of hydrocarbons to be cracked.

The bringing of the catalytic mass first into contact with the hydrocarbons and then into contact with the oxidizing gases may be accomplished by keeping the catalytic mass stationary and diverting the hydrocarbon stream and replacing it with a stream of oxidizing gas in contact with the catalyst, or (in an apparatus of the "moving catalyst" type) the streams of hydrocarbon vapor and oxidizing gas may be passed continuously through chambers, the catalytic mass or a series of them being moved from one chamber to the other as the cycle progresses. The latter procedure is preferable, because it permits maintenance of more uniform operating conditions due to the continuous flow of the reactants through the several zones.

I have developed an improved apparatus of the "moving catalyst" type which is simple in construction, and permits circulating a series of catalytic masses between a cracking zone and a regenerating zone without hazard of explosion due to admixture of gases by leakage between zones. The apparatus of my invention comprises a pair of elongated chambers disposed (preferably in approximately horizontal position) side by side. Each chamber is large enough to accommodate a train of catalytic masses kept in separate holders, such, for example, as rectangular boxes. Means are provided for passing vapor transversely through the chambers and the train of catalytic masses disposed therein. Thus, through the cracking chamber hydrocarbon vapors are passed transversely while through the regeneration chamber hot oxidizing gases are similarly passed. The chambers are interconnected at both ends by means of steam double locks which serve the dual purpose of preventing objectionable leakage between the cracking and regenerating sections and of purging the catalytic masses passed through them. The double locks provide positive seals between the several zones of the apparatus. Rams or other moving means are provided for moving the catalytic masses cyclically from the cracking chamber through a steam lock into the regenerating chamber and thence through a steam lock back into the cracking chamber.

Thus, my invention contemplates in apparatus for catalytic cracking of hydrocarbons the combination which comprises a train of boxes or cases charged with catalyst, an elongated cracking chamber capable of accommodating a plurality of the boxes end to end, an elongated regenerating chamber capable of accommodating a plurality of the boxes end to end, a double lock connecting an end of the cracking chamber with an adjacent end of the regenerating chamber, a second double lock connecting the other end of the cracking chamber with the other end of the regenerating chamber, means for passing a stream of hydrocarbons to be cracked substantially continuously through the cracking chamber in contact with the catalyst in the boxes, means for passing a stream of oxidizing gas substantially continuously through the regenerating chamber in contact with the catalyst in the boxes, and means for moving the boxes cyclically from the cracking chamber through the first lock, the regenerating chamber and the second lock. Each lock comprises two compartments, both of which are large enough to accommodate at least one box, with valves disposed respectively between the two compartments and between each compartment and the chamber adjacent thereto.

The double steam locks have at least three valves and are composed of at least two compartments to assure the establishment of a positive seal between the cracking chamber and the regenerating chamber. Each compartment of the locks is large enough to accommodate at least one box. In a preferred form of the apparatus, an auxiliary steam lock is provided. This is connected to one of the double steam locks and through it boxes may be introduced from the exterior of the apparatus.

My invention will be more thoroughly understood in the light of the following detailed description taken in conjunction with the accompanying drawings in which:

Fig. 1 is a diagrammatic plan of a catalytic cracking apparatus constructed in accordance with my invention;

Fig. 2 is a vertical section of the apparatus of Fig. 1 taken along the line 2—2;

Fig. 3 is another vertical section of the apparatus of Fig. 1 taken along the line 3—3;

Fig. 4 is a further vertical section taken transversely through the apparatus of Fig. 1 along the line 4—4;

Figs. 5, 6, 7, 8, 9 and 10 are diagrammatic plans illustrating the movement of the catalytic masses through the apparatus of Fig. 1;

Figs. 11, 12 and 13 are diagrammatic plans illustrating the withdrawal of a catalytic mass from the apparatus and its replacement by a new catalytic mass;

Fig. 14 is a diagrammatic plan of a preferred form of the catalytic cracking of the apparatus of my invention;

Fig. 15 is a vertical section of the apparatus of Fig. 14 taken along the line 15—15;

Fig. 16 is another vertical section of the apparatus of Fig. 14 taken along the line 16—16;

Figure 17:
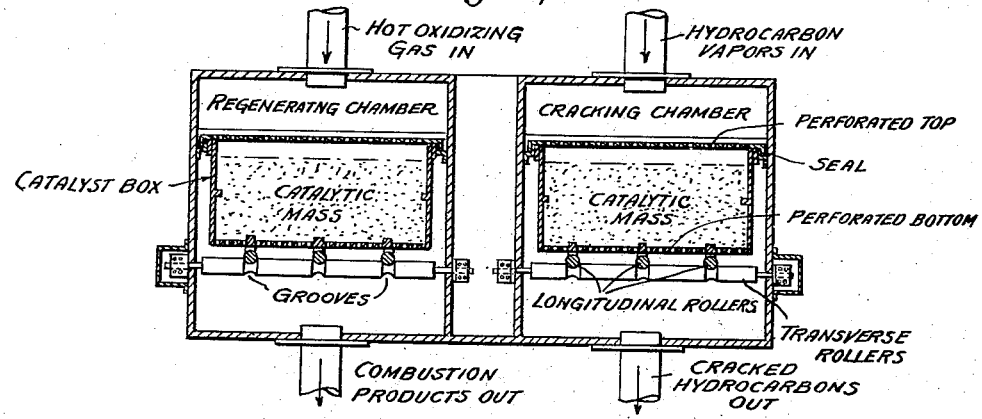
Fig. 17 is a transverse vertical section of the apparatus of Fig. 14 taken along the line 17—17.

Referring now to Figs. 1 to 4 inclusive, it will be observed that the apparatus comprises an elongated cracking chamber disposed substantially horizontally and of approximately rectangular section. A regenerating chamber is provided that is similar in construction to the cracking chamber and is disposed beside it and substantially parallel thereto.

Adjacent ends of the cracking chamber and the regeneration chamber are connected to double steam locks.

Both the cracking chamber and the regeneration chamber are sufficiently long to accommodate a plurality of boxes or holders carrying the catalytic mass. In the apparatus illustrated, both cracking chamber and regeneration chamber can accommodate six or these boxes. The steam locks both have double compartments each of which is large enough to accommodate a single catalyst box.

A typical catalyst box is rectangular and approximately square in plan. Its sides and ends are composed of solid plates but its top is perforated and its bottom has sloping side portions and a central horizontal portion all of which are perforated (Fig. 4). The box contains a catalytic mass of, say, fuller's earth that rests upon the bottom and fills the box to a point adjacent the perforated top.

In both the cracking chamber and the regeneration chamber, the boxes are movable longitudinally along series of parallel rollers. Thus, in each chamber there are two series of parallel rollers which slope toward the inside of the chamber and are rotatably mounted at both ends. The slope of the rollers conforms to that of the sloping side portions of the bottom of the box. The series of rollers slope slightly longitudinally at the ends of the cracking chamber and the regeneration chamber so that a box being pushed through these chambers moves slightly uphill as it enters a chamber, and then is kept substantially level until it reaches the end of the chamber when it rolls downhill into a compartment of the steam lock. In so doing, it rolls through the valve seat and leaves room for the valve to close.

Gases are prevented from by-passing the catalyst boxes in the regeneration chamber and in the cracking chamber by means of seals disposed at the upper sides of the boxes and running longitudinally on both sides of the cracking chamber and the regeneration chamber. The seals are formed of interlocking flanges fastened, respectively, to the sides of the boxes and to the sides of the chambers. (See Fig. 4.)

As indicated above, during operation the cracking chamber and the regeneration chamber are filled by trains of boxes which abut each other at their ends so that if a box at the end of the train is pushed, movement is imparted to all the boxes of the train.

Hydrocarbon gases to be cracked are introduced into the lower portion of the cracking chamber through a manifold having branches corresponding in number to the number of boxes in the chamber—in the instant case, six. The bottom of the cracking chamber is divided transversely by a plurality of baffles into compartments which match the boxes of the train, each branch of the manifold feeding a compartment. Likewise, the upper portion of the cracking chamber is divided into matching compartments by baffles and cracked hydrocarbons are withdrawn from the upper portion of the cracking chamber through a manifold that communicates with the several upper compartments. Thus, hot hydrocarbon vapors to be cracked are introduced into the lower compartments and pass as parallel streams upwardly through the boxes of the train into the upper compartments, the cracked hydrocarbon product being withdrawn in vapor form through the upper manifold.

The construction of the regenerating chamber is substantially identical to that of the cracking chamber. A lower manifold with branches serves to introduce hot oxidizing gases into a series of compartments in the lower portion of the regenerating chamber that match the boxes therein. The several compartments are defined by baffles. The upper portion of the regenerating chamber is likewise divided by baffles into matching compartments, each compartment being connected to a branch of a manifold through which the products of combustion are withdrawn.

Boxes are moved from left to right, as shown in Fig. 1, through the cracking chamber. At each box movement, the box at the right end is pushed so that it rolls past the valve into the right hand or first steam lock. This steam lock comprises two compartments A, B. The first compartment A communicates with the right end of the cracking chamber through a gate valve 20 provided with a recess. This gate valve is power operated by means of a conventional double-acting steam or air cylinder. The two compartments A, B of this steam lock are separated from each other by another gate valve 21 provided with a recess and power operated by means of a cylinder. The second compartment (B) of the first steam lock is provided with an additional gate valve 22 with a recess and this gate when opened by its cylinder permits communication with the right hand end of the regenerating chamber. Parallel with the valve 21, dividing the two compartments of the first steam lock and at the opposite end of the compartment B, is a further valve 23 with a recess and an air or steam cylinder. This valve when opened permits communication with an auxiliary steam lock provided for withdrawing catalyst boxes and replacing them during the operation of the apparatus. This auxiliary steam lock has a manually operated gate valve 24 communicating with the outside.

The second steam lock, which connects the opposite ends of regenerating and cracking chambers, is similar in construction to that of the first steam lock but does not have communication with an auxiliary lock. Thus, the second steam lock is provided into two compartments C, D, the first of which (C) is separated from the left hand end of the regeneration member by means of a valve 25 that may be moved in and out of a recess by means of a steam or air cylinder. The two compartments C, D, of the steam lock are divided by a valve 26 that may be withdrawn into a recess by another steam cylinder. A further gate valve 27 with a recess and a steam or air operated cylinder is provided for closing the D compartment of this steam lock from the left hand end of the cracking chamber. All of these valves should be gastight or nearly so in order to prevent leakage from the chambers into the locks or vice versa.

Circulation of the catalyst boxes through the apparatus, i. e., from the cracking chamber into the first steam lock, through the first steam lock into the regeneration chamber, through the regeneration chamber into the second steam lock and thence back into the cracking chamber is accomplished by means of rams driven by conventional double-acting steam or air cylinders disposed outside the apparatus and passing thereinto through stuffing boxes. Thus, a first ram is mounted with its axis in line with that of the cracking chamber and is disposed outside the second (D) compartment of the second steam lock. This ram passes through a stuffing box at the end of the lock and is driven by means of a steam or air operated cylinder (30). It has a stroke slightly more than the length of one catalyst box. Movement of the catalyst boxes sidewise through the first steam lock is accomplished by means of a second ram which passes through a stuffing box in the upper right hand wall of the first steam lock (Fig. 1). This ram is, likewise, operated by means of a steam or air cylinder. The stroke of this ram is slightly more than the width of two catalyst boxes so that it may be employed to push a box from the first compartment of the first steam lock into an auxiliary steam lock. The box slides sidewise through the lock on horizontal rods or rollers.

Movement of boxes from the second compartment of the steam lock through the regenerating chamber is accomplished by means of a third ram which is substantially identical in construction to the first ram and is disposed on the right hand end of the second (B) compartment of the first steam lock with its stroke along the axis of the regenerating chamber. This ram, like the first ram, has a stroke slightly more than the length of one catalyst box. A fourth ram is provided for pushing catalyst boxes sidewise from the first (C) compartment of the second steam lock into the second (D) compartment of this lock along a set of horizontal rods or rollers. This ram is substantially similar in construction to the second ram but its stroke need be only sufficient to move a box from one compartment of the second lock to the other. Thus, it need have a stroke only slightly in excess of the width of a box.

As shown in Figs. 2 and 3, both compartments of both steam locks are provided with means for passing steam or other purging gas upwardly through the boxes disposed in the compartments. Thus, all compartments of the locks chamber are provided with steam inlet pipes and steam outlet pipes.

In general, the operation of the apparatus just described is an intermittent movement of the boxes in a clockwise cycle from the cracking chamber through the first steam lock into the regenerating chamber and thence through the second steam lock into the cracking chamber. Whenever a gate between a chamber and a lock compartment is open, the gate separating the two compartments of a lock is closed so as to prevent leakage around the cycle of movement. Likewise, the gate between a chamber and a lock is closed when the gate in the lock is open.

During operation, the apparatus contains enough boxes to fill both the cracking chamber and the regenerating chamber plus one box for each lock. Thus, in the apparatus illustrated there are fourteen boxes—six in each chamber plus two more. The disposition of the boxes at various stages of the cycle and the operation of the apparatus is best described with reference to Figs. 5, 6, 7, 8, 9 and 10.

Referring first to Fig. 5, it will be observed that the valves 27, 20 at opposite ends of the cracking chamber are open to permit the first ram to push the train of boxes so that the right hand box is impelled down the incline into the first compartment of the first steam lock, the valves 26, 21 between the two compartments of each steam lock being closed. The valves 27, 20 separating the cracking chamber from the steam locks are then closed (Fig. 6). Next, (Fig. 7) the valves 22, 25 separating the regenerating chamber from the locks at either end are opened and the third ram is employed to push a train of boxes through the regenerating chamber so that a box enters the first (C) compartment of the second steam lock at the same time that a box is pushed from the second (B) compartment of the first steam lock into the regenerating chamber. The valves 22, 25 separating the regenerating chamber from the locks at either end are then closed (Fig. 8). Next, the valves 26, 21 separating the compartments of both steam locks from each other are opened and the second ram is employed to slide a box sidewise from the A compartment of the first lock into the B compartment of this lock, while the fourth ram is employed to push a box from the C to the D compartment of the second steam lock (Fig. 9). The cycle is completed (Fig. 10) with the valves 21, 26 separating the compartments of both locks closed, the valves 27, 20 separating the steam locks from the cracking chamber, being open so that the process may continue as shown in Fig. 5.

Occasionally, it is necessary to replace a catalyst box and this may be accomplished without interruption in the cycle by means of the auxiliary lock, the operation for this purpose being shown in Figs. 11, 12 and 13. Thus, in Fig. 11, the second ram is employed to push a catalyst box sidewise through both compartments of the first steam lock into the auxiliary lock with valve 21, 23 open. The auxiliary lock is then closed from the first steam lock by means of the intervening valve 23 so that the outside valve 24 on the auxiliary lock may be opened to permit removal of the used catalyst box. When the used catalyst box is replaced by a fresh one, the latter is pushed back into the second compartment of the first steam lock by means of a fifth ram and takes its place in the train of catalyst boxes which meanwhile are moving through the apparatus in the usual manner.

The catalyst boxes are moved one by one as they become fouled from the cracking chamber into the first steam lock, where they are purged by steam that passes through the catalytic mass and removes entrained hydrocarbons which pass out of the exit with the steam. In some cases, relatively inert gases other than steam may be used for purging, for example, hot nitrogen. After purging, the catalyst boxes enter the regenerating chamber where solid carbon and the like on the surfaces of the catalyst mass are burned in the stream of hot oxidizing gas. The boxes are again purged by steam or the like in the second steam lock and then re-enter the cracking chamber. Flow of hydrocarbons through the cracking chamber, of steam through the locks and of oxidizing gas through the regenerating chamber is substantially uninterrupted during operation.

Figure 18:
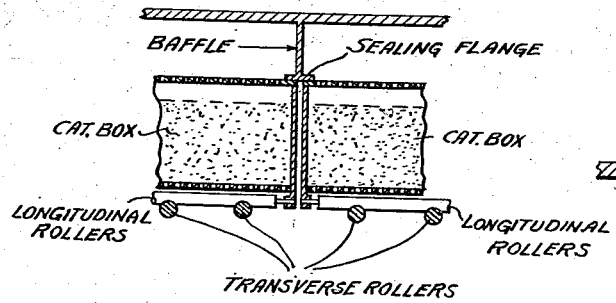
Fig. 18 is a fragmentary vertical section through the apparatus of Fig. 14 taken along the line 18—18 and illustrating a preferred type of flanged baffle which forms a seal with the upper edges of the catalyst boxes.
Figure 19:
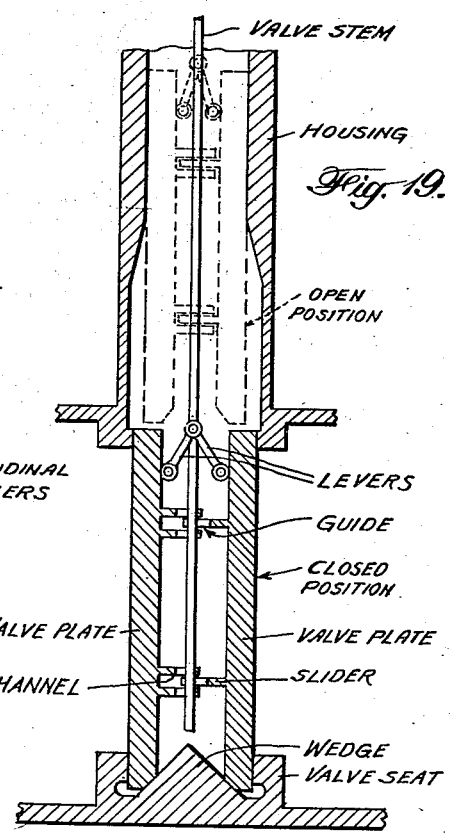
Fig. 19 is an enlarged vertical section of a preferred type of valve employed in the apparatus of Figs. 14 to 18.

The apparatus of Figs. 15 to 19, inclusive (hereinafter sometimes referred to as the second apparatus) operates on the same principle as that of the first apparatus shown in Figs. 1 to 4, but embodies several important structural features which make for more reliable operation and fewer repairs.

In the apparatus of Figs. 15 to 19 there are the same number of catalyst boxes as in the apparatus described heretofore, and these boxes pursue the same path through the cracking chamber, the first steam lock, the regenerating chamber, and the second steam lock. However, vapors and gases are passed downwardly through the catalyst boxes instead of upwardly. This downward flow of hydrocarbon vapors, steam and oxidizing gases in the cracking, purging and regeneration zones, respectively, tends to increase the useful life of the catalytic mass. Thus, a catalyst comprising a mass of loose particles tends to be fluffed upwardly in the boxes if the flow of vapors is upward. This fluffing results in a grinding action between the particles which causes them to disintegrate. When the flow of vapors is downward, as in the apparatus of Figs. 15 to 19, the fluffing and the attendant grinding action are avoided and the useful life of the catalytic mass is substantially increased.

As shown in Figs. 14, 15 and 16, the hydrocarbon vapors are introduced through a manifold into the upper portion of the regenerating chamber and pass downwardly through the catalyst boxes in this chamber, being withdrawn through another manifold. Similarly, hot oxidizing gases are introduced into the upper portion of the regenerating chamber and passed downwardly through the catalyst boxes therein, being withdrawn through a lower manifold. The steam flow through the locks is also downward since the steam is introduced into an upper portion of each lock compartment and passes downwardly through the catalyst boxes therein to a steam outlet.

The catalyst boxes in the second apparatus are somewhat different in construction from those of the apparatus described hereinbefore, and are supported and moved by means of a modified structure. Thus, as shown particularly in Fig. 17, the perforated bottom of a catalyst box is flat across its width and rests upon three longitudinal rollers rotatably mounted on the box. The longitudinal rollers rest on a series of transverse rollers which are mounted at each end upon pins that extend through the sides of the chambers and are journaled outside the chambers in bearings which are kept cool and are easily accessible for lubrication purposes. The transverse rollers in the regenerating chambers and in the cracking chambers have three grooves which match the longitudinal rollers and give a greater bearing surface between the two types of rollers, at the same time serving as guides.

The transverse rollers in the two steam locks are ungrooved, so as not to interfere with the action of the rams in moving the boxes from one compartment of a lock to the other.

As indicated in the description of the first apparatus, catalyst boxes leaving the cracking chamber or the regenerating chamber should be given impetus in addition to that furnished by the rams so that they will separate from the boxes behind them and move completely through the valves into the adjacent lock compartments. In the first apparatus this result is obtained by sloping the series of rollers from the chambers to the lock compartments. In the second apparatus, movement of the boxes completely through the valves at the exits of the chambers is further assured by the fact that the transverse rollers in the adjacent lock compartments are power-driven, i. e., positively rotated in the proper direction so that they pull the boxes into the compartments. In other words, the transverse rollers in lock compartments A and C are power-driven by pulleys or other conventional means. The rollers in the other compartments need not be power-driven, since the rams move the boxes completely through the valves at the entrances to the cracking and regenerating chambers.

The baffle structures in the cracking chamber and the regenerating chamber of the second apparatus represent a substantial improvement and aid in preventing vapors from by-passing the catalyst boxes. As shown in Figs. 15 and 16, no baffles are provided in the lower portions of the cracking chamber and the regenerating chamber, and are unnecessary in view of the more positive seal provided between catalyst boxes by the baffles in the upper portion of the cracking chamber and the regenerating chamber. Thus, as shown in detail in Fig. 18, the baffles in the upper portions of these chambers have horizontal flanges on their lower edges which seal the joint between the adjacent boxes when these are in operating position. The sides of the boxes in the second apparatus are sealed in the same manner as in the first apparatus by means of interlocking longitudinal flanges connected, respectively, to the upper edges of the catalyst boxes and the sides of the chambers in which the boxes are contained.

To prevent steam from by-passing around the catalyst boxes in the steam locks, the upper portions of the lock compartments are provided with steam hoods. These steam hoods extend downwardly and come in contact with catalyst boxes in the locks to form a reasonably tight joint. Thus, steam entering the upper portion of a lock compartment is directed through the catalyst boxes rather than around them. In order to have effective purging, the steam must pass through the catalyst boxes and the hoods permit purging to be accomplished with a minimum steam consumption.

The rams in the second apparatus are identical with those of the first and are operated by means of double acting steam or air cylinders. However, the rams of either type of apparatus can be reciprocated by means of motor-driven racks and pinions (not shown).

In the second apparatus, the valves move vertically instead of horizontally and are of an improved type adapted to be opened and closed easily. The details of construction of the valves may best be understood through reference to Fig. 19, from which it will be observed that the valve comprises two plates adapted to slide vertically in a housing. When the valve is opened, the plates are held relatively close together in the narrow upper portion of the housing. As the plates are moved to the closed portion, they are pushed outwardly from each other by means of levers that pivot in a vertical longitudinal plane and are hinged at their upper ends to the valve stem and at their lower ends to the insides of the two plates. As the plates move downwardly they come in contact with a wedge extending transversely across the lower portion of the valve. The wedge cooperates with the valve stem to push the plates outwardly against the valve seat. In this way, the plates are caused to bear firmly against both sides of the valve seat and form a tight seal. When the valve stem is pulled upward, the levers no longer exert outward pressure and the plates collapse toward each other, being guided to their closed position by slanting side portions in the upper part of the housing. The plates are prevented from moving in a vertical direction with respect to each other by sliding guides disposed between the plates. Thus, one plate may have a horizontal channel in which a horizontal slider moves as the gate is raised and lowered.

The valve stem may be moved by any convenient apparatus such as the double acting cylinders shown in Figs. 15 and 16, or motor driven racks and pinions (not shown).

In the operation of the second apparatus, the catalyst boxes pursue the same path as that described hereinbefore with reference to Figs. 5 to 10, inclusive, catalyst boxes being replaced as shown by Figs. 11 to 13. The rams and valves operate in the same sequence as described hereinbefore with reference to the first apparatus. However, the power-driven rollers in the steam locks adjacent the outlets of the cracking and regenerating chambers, respectively, aid in moving the boxes through the valve seats.

It should be noted that in both types of apparatus illustrated herein, a certain amount of hydrocarbon vapors will pass from the cracking chamber into the lock compartments A and D at either end when the valves between the locks and the cracking chamber are open. These hydrocarbon vapors and others removed from the catalyst boxes during the purging will pass out of the apparatus with the exhaust steam. Consequently, exhaust steam from compartments A and D should be sent into a conventional vapor condenser (not shown) in which the hydrocarbons can be recovered. The other compartments of the locks may be vented to air.

Steam flow to a compartment of a lock should be cut off when the compartment is in communication with the cracking chamber or the regenerating chamber (as the case maybe) in order to reduce steam consumption.

I claim:

1. In apparatus for catalytic cracking of hydrocarbons, the combination which comprises a train of boxes charged with catalyst, an elongated cracking chamber capable of accommodating a plurality of the boxes end to end, an elongated regenerating chamber capable of accommodating a plurality of the boxes end to end, a double lock connecting an end of the cracking chamber with an adjacent end of the regenerating chamber and comprising two compartments each large enough to accommodate at least one box with valves disposed respectively between the two compartments and between each compartment and the chamber adjacent thereto, a second double lock connecting the other end of the cracking chamber with the other end of the regenerating chamber and comprising two compartments each large enough to accommodate at least one box with valves disposed respectively between the two compartments and between each compartment and the chamber adjacent thereto, means for passing a stream of hydrocarbons to be cracked substantially continuously through the cracking chamber in contact with the catalyst in the boxes, means for passing a stream of oxidizing gas substantially continuously through the regenerating chamber in contact with the catalyst in the boxes, and means for moving the boxes cyclically from the cracking chamber through the first lock, the regenerating chamber and the second lock.

2. In apparatus for catalytic cracking of hydrocarbons, the improvement which comprises a train of boxes charged with catalyst, an elongated approximately horizontal cracking chamber capable of accommodating a plurality of the boxes end to end, an elongated approximately horizontal regenerating chamber capable of accommodating a plurality of the boxes end to end, a double steam lock connecting an end of the cracking chamber with an adjacent end of the regenerating chamber and comprising two compartments each large enough to accommodate at least one box with valves disposed respectively between the two compartments and between each compartment and the chamber adjacent thereto, a second double steam lock connecting the other end of the cracking chamber with the other end of the regenerating chamber and comprising two compartments each large enough to accommodate at least one box with valves disposed respectively between the two compartments and between each compartment and the chamber adjacent thereto, means for passing a stream of hydrocarbons to be cracked substantially continuously through the cracking chamber in contact with the catalyst in the boxes, means for passing a stream of oxidizing gas substantially continuously through the regenerating chamber in contact with the catalyst in the boxes, and means for moving the boxes cyclically from the cracking chamber through the first steam lock, the regenerating chamber and the second steam lock.

3. In apparatus for catalytic cracking of hydrocarbons, the improvement which comprises a train of boxes charged with catalyst, an elongated cracking chamber capable of accommodating a plurality of the boxes end to end, an elongated regenerating chamber capable of accommodating a plurality of the boxes end to end, a double steam lock connecting an end of the cracking chamber with an adjacent end of the regenerating chamber and comprising two compartments each large enough to accommodate at least one box with valves disposed respectively between the two compartments and between each compartment and the chamber adjacent thereto, a second double steam lock connecting the other end of the cracking chamber with the other end of the regenerating chamber and comprising two compartments each large enough to accommodate at least one box with valves disposed respectively between the two compartments and between each compartment and the chamber adjacent thereto, means for passing a stream of hydrocarbons to be cracked substantially continuously through the cracking chamber in contact with the catalyst in the boxes, means for passing a stream of oxidizing gas substantially continuously through the regenerating chamber in contact with the catalyst in the boxes, and rams for moving the boxes cyclically from the cracking chamber through the first steam lock, the regenerating chamber and the second steam lock.

4. In apparatus for catalytic cracking of hydrocarbons, the improvement which comprises a train of boxes charged with catalyst, an elongated approximately horizontal cracking chamber capable of accommodating a plurality of the boxes end to end, an elongated approximately horizontal regenerating chamber capable of accommodating a plurality of the boxes end to end, a double steam lock connecting an end of the cracking chamber with an adjacent end of the regenerating chamber, a second double steam lock connecting the other end of the cracking chamber with the other end of the regenerating chamber, means for passing a stream of hydrocarbons to be cracked substantially continuously through the cracking chamber in contact with the catalyst in the boxes, means for passing a stream of oxidizing gas substantially continuously through the regenerating chamber in contact with the catalyst in the boxes, rams for moving the boxes cyclically from the cracking chamber through the first steam lock, the regenerating chamber and the second steam lock, and rollers in the respective chambers supporting the boxes therein, said rollers sloping toward the exits of the boxes from the chambers.

5. In apparatus for catalytic cracking of hydrocarbons, the improvement which comprises a train of boxes charged with catalyst, an elongated cracking chamber capable of accommodating a plurality of the boxes end to end, an elongated regenerating chamber capable of accommodating a plurality of the boxes end to end, a double steam lock having at least three valves and composed of at least two compartments connecting an end of the cracking chamber with an adjacent end of the regenerating chamber, a second double steam lock having at least three valves and composed of at least two compartments connecting the other end of the cracking chamber with the other end of the regenerating chamber, means for passing a stream of hydrocarbons to be cracked substantially continuously through the cracking chamber in contact with the catalyst in the boxes, means for passing a stream of oxidizing gas substantially continuously through the regenerating chamber in contact with the catalyst in the boxes, and means for moving the boxes cyclically from the cracking chamber through the first steam lock, the regenerating chamber and the second steam lock.

6. In apparatus for catalytic cracking of hydrocarbons, the improvement which comprises a train of boxes charged with catalyst, an elongated cracking chamber capable of accommodating a plurality of the boxes end to end, an elongated regenerating chamber capable of accommodating a plurality of the boxes end to end, a double steam lock connecting an end of the cracking chamber with an adjacent end of the regenerating chamber and comprising two compartments each large enough to accommodate at least one box with valves disposed respectively between the two compartments and between each compartment and the chamber adjacent thereto, a second double steam lock connecting the other end of the cracking chamber with the other end of the regenerating chamber and comprising two compartments each large enough to accommodate at least one box with valves disposed respectively between the two compartments and between each compartment and the chamber adjacent thereto, means for passing a stream of hydrocarbons to be cracked substantially continuously through the cracking chamber in contact with the catalyst in the boxes, means for passing a stream of oxidizing gas substantially continuously through the regenerating chamber in contact with the catalyst in the boxes, and a plurality of rams for moving the boxes cyclically from the cracking chamber through the first steam lock, the regenerating chamber and the second steam lock.

7. In apparatus for catalytic cracking of hydrocarbons, the improvement which comprises a train of boxes charged with catalyst, an elongated cracking chamber capable of accommodating a plurality of the boxes end to end, an elongated regenerating chamber capable of accommodating a plurality of the boxes end to end, a double steam lock connecting an end of the cracking chamber with an adjacent end of the regenerating chamber, a second double steam lock connecting the other end of the cracking chamber with the other end of the regenerating chamber, means for passing a stream of hydrocarbons to be cracked substantially continuously through the cracking chamber in contact with the catalyst in the boxes, means for passing a stream of oxidizing gas substantially continuously through the regenerating chamber in contact with the catalyst in the boxes, means for moving the boxes cyclically from the cracking chamber through the first steam lock, the regenerating chamber and the second steam lock, and an auxiliary steam lock connected to one of the double steam locks and through which boxes may be introduced thereinto from the exterior of the apparatus.

8. In apparatus for catalytic cracking of hydrocarbons, the combination which comprises a train of boxes charged with catalyst, an elongated cracking chamber capable of accommodating a plurality of the boxes end to end, an elongated regenerating chamber capable of accommodating a plurality of the boxes end to end, a double lock connecting an end of the cracking chamber with an adjacent end of the regenerating chamber, a second double lock connecting the other end of the cracking chamber with the other end of the regenerating chamber, means for passing a stream of hydrocarbons to be cracked substantially continuously through the cracking chamber in contact with the catalyst in the boxes, means for passing a stream oxidizing gas substantially continuously through the regenerating chamber in contact with the catalyst in the boxes, means for moving the boxes cyclically from the cracking chamber through the first lock, the regenerating chamber and the second lock, a plurality of first rollers for supporting the boxes, said rollers being disposed in the cracking chamber and regenerating chamber respectively with their axes of rotation transverse to the direction of movement of the boxes through the chamber, each box being provided with a plurality of rollers fastened to the bottom thereof transverse to the first rollers and resting thereupon.

GEORGE F. KUHN.